Feb. 19, 1935. S. W. MELSOM 1,991,935
ELECTRICAL RESISTANCE, RESISTANCE HEATER, AND THE LIKE
Filed March 1, 1933 2 Sheets-Sheet 1
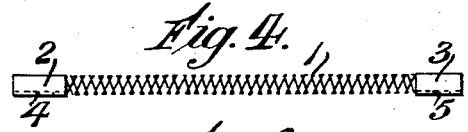
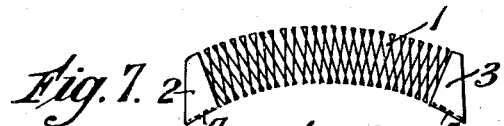
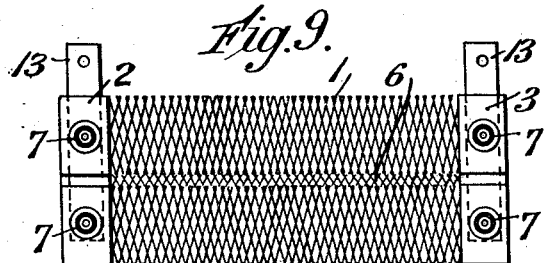
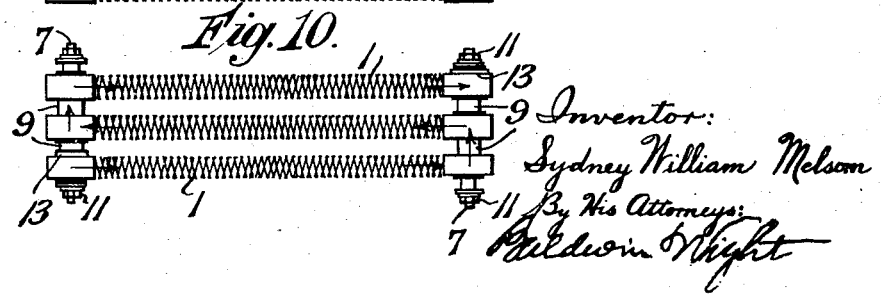

Feb. 19, 1935.  S. W. MELSOM  1,991,935
ELECTRICAL RESISTANCE, RESISTANCE HEATER, AND THE LIKE
Filed March 1, 1933  2 Sheets-Sheet 2
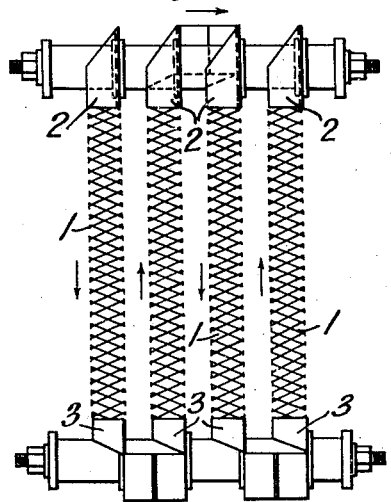
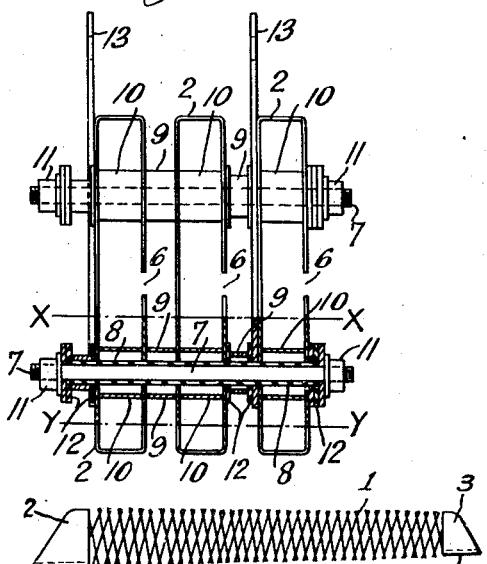
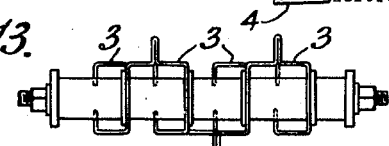
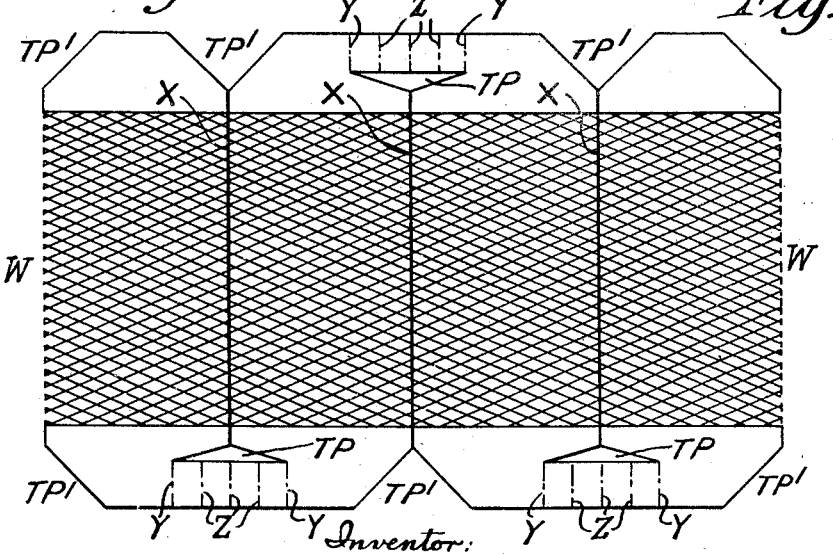

Patented Feb. 19, 1935

1,991,935

UNITED STATES PATENT OFFICE 1,991,935

ELECTRICAL RESISTANCE, RESISTANCE HEATER, AND THE LIKE

Sydney William Melsom, West Hartlepool, England, assignor to The Expanded Metal Company Limited, London, England Application March 1, 1933, Serial No. 659,184
In Great Britain March 4, 1932

6 Claims. (Cl. 201—74)

This invention relates to electrical resistances, resistance heaters and the like made of expanded metal and more particularly, though not exclusively, to expanded metal electrical resistances for use in resistance units, such as are commonly employed in electric motor control and similar electrical control systems.

One of the main objects of the present invention is to provide an expanded metal electrical resistance device which shall be very cheap and simple to manufacture, mechanically very strong, and immune from liability to damage by vibration and like causes, low in weight for a given wattage, and capable of being operated at high temperatures if necessary with only end supports for the heated elements and without difficulties arising by reason of distortion due to expansion of the heated elements.

According to this invention an electrical resistance element is constituted by expanded metal in split tubular girder form, i. e., in effect, in the form of a tubular girder, the tube being not completely closed, so that the section is like that of a tube having a slit therein. The word "tube" as employed in this connection is not limited to structures having a circular section, as the section may be, and in some cases preferably is, rectangular or triangular.

Connection may be made to resistance elements in accordance with this invention by means of unexpanded end pieces formed integral with the expanded portion.

In one way of carrying out the invention an electrical resistance is manufactured in the following manner:—

A sheet of metal is expanded (by any well known process of manufacturing expanded metal) so as to obtain an expanded sheet having at opposite edges thereof unexpanded edgings integral with the expanded portion. The corners of the unexpanded edgings are cut away diagonally so that the whole sheet now consists of a sheet of expanded metal having at either end thereof unexpanded edgings shaped each like a triangle having the apex cut away. The sheet with its edgings is now bent up into rectangular split tubular form (the axis of the split tube being at right angles to the unexpanded edgings) so that the edges which do not carry the unexpanded metal do not touch one another. In other words the sheet is so bent that in section it is of rectangular form, the expanded metal passing round three sides of a rectangle and the two edges which do not carry the unexpanded metal being opposite one another on the fourth side of the rectangle. Holes are drilled in the unexpanded portions to enable connections to be made to the resistance element and to facilitate mounting the resistance element in a suitable carrier together with other resistance elements of similar form.

Where a plurality of resistance elements as above described are required, a single sheet of metal may be expanded and left with unexpanded edges, and the required portions of the unexpanded edges cut away. The sheet may then be split into component portions and each of the component portions bent up into a tubular element, as above stated.

Alternatively, where a plurality of elements in parallel are required the splitting of the sheet into mechanically separate component portions may be dispensed with, so that a plurality of mechanically united elements in parallel is obtained. Again where a series or series parallel connected arrangement is desired this may be obtained by splitting the sheet with splits that do not extend the whole length of the sheet; for example, in an arrangement wherein adjacent splits start from opposite ends of the sheet but do not extend the whole length thereof, each element, or parallel group of elements on one side of a split and between adjacent splits would be in series with each element or group of elements on the other side of that split.

If desired, the section may be such that the expanded metal of each element embraces only three sides of a rectangle. This construction, though perhaps not so neat and strong as that in which the expanded metal embraces about three and a half sides, presents the advantage that the expanding of the metal, the cutting away of the required portions of the unexpanded edgings, and the bending up of the expanded metal into a plurality of resistance elements, may be effected before the sheet is cut up into separate resistance elements, i. e. the expanded metal sheet with the unexpanded edges may be bent back and forth into the form of a zigzag and then cut up into component elements each of U-section. Similarly, if instead of employing rectangular or square cross section, semi-circular cross section is adopted, a similar method of including a plurality of elements in a single sheet and then cutting up the bent expanded sheet into component elements, may be adopted.

The incomplete tubular structures may take any of a variety of different sections, for example, (as above stated), square or rectangular or semi-circular or almost completely circular. In most cases, it is preferred to arrange the expanded metal in such manner that the longer dimension of the diamond mesh is at right angles to the length of the element.

Although in the particular constructions so far described what have been termed the "splits" in the tubular structures are parallel to the axis of the tubular structures, this is not necessary and the said splits may, as it were, run round the section from end to end in the manner of a helix. Further, it is not necessary that the section of a tubular resistance element in accordance with the invention should be the same at every point in its length, and in some cases advantage will be obtained by making the tube-like structure tapered from end to end, the advantage of this being particularly apparent when the elements are mounted vertically, since as regards a vertical air stream through the element each different cross section will not be masked by a cross section above or below it. Where a plurality of tapered elements are employed, it is preferred, for reasons of economy of space, to mount adjacent elements oppositely so that whereas one element tapers upwardly the two on either sides thereof will taper downwardly, the spaces between adjacent elements thus being parallel.

The invention is illustrated in the accompanying drawings in which Figure 1 shows in elevation, Figure 2 in plan, and Figure 3 in end view, one preferred form of resistance element in accordance with the invention; Figure 4 shows in side elevation, Figure 5 in end view and Figure 6 in plan a modified form; Figure 7 shows in elevation, and Figure 8 in plan a still further modified form; while Figure 9 shows in elevation, Figure 10 in plan and Figure 11 in part sectioned end view three elements such as are shown in Figures 4 to 6, assembled together so as to be electrically in series. In Figure 11 the portions between the lines XX, YY, are shown in section, the section being taken through the centre of the lower clamp bolt. Figures 12 and 13 show a preferred construction wherein an integrally formed plurality of elements is employed and Figure 14 is illustrative of a step in the process of manufacturing the construction shown in Figures 12 and 13. Figures 15 and 16 show a modification of the element shown in Figures 1 to 3, the views of Figures 15 and 16 corresponding to those of Figures 1 and 2. The structures shown in the drawings are all of expanded metal, but for the sake of simplicity the expanded mesh has been merely represented conventionally.

Referring to Figures 1 to 3 the element therein shown consists of a split straight tubular member of substantially square section and consisting of expanded metal 1 having unexpanded ends 2, 3, formed integral with the expanded portion, the unexpanded ends being drilled with holes, 4, 5, for receiving mounting or connecting bolts. The element is made as a flat sheet expanded between unexpanded edges, the unexpanded edges being trimmed to shape and the sheet then simply bent up in the form shown leaving the split 6.

The element shown in Figures 4 to 6 differs from that above described only in that the section is different, the tube being much flatter.

The element shown in Figures 7 and 8 differs from that shown in Figures 1 to 3 only in that the tube is arched instead of straight. This construction is of obvious advantage in the case of long elements.

Figures 9, 10 and 11 show three elements mounted together in series the path of the current being indicated by arrows in Figure 10. As will be seen the elements are clamped together by bolts 7 each in an insulated tube 8, the elements being spaced apart by distance tubes 9 of metal. Similar tubes 10 prevent the elements from being flattened on tightening the nuts 11. If desired springs may be placed under the nuts and/or between elements and spacers to take up for any differences between the expansion of the clamping bolts and the expansion (in the direction of the length of the bolts) of the elements themselves. Such springs which will also tend to relieve the structure vibration stresses, will ordinarily, however not be necessary. Where adjacent elements are required to be connected in series the tubes 10 are allowed to bear direct against them so as to connect them in series; where insulation is required insulating washers 12 are provided as illustrated. 13 are external connection strips. The method of assembly, interconnection and insulation adopted in the structure shown in Figures 9 to 11 is very simple, but, of course, other methods may be employed. For example, in place of relying upon spacing tubes 10 for carrying the series current, the elements may be left with unexpanded extended ends or tags may be punched out of the unexpanded edges of the elements and the extended ends or tags on adjacent elements bent over one another and bolted, clamped, or if desired, brazed or welded together where connection is required.

In the construction shown in Figures 12 and 13 the four elements consist each of a split straight tubular member of rectangular section and consisting of expanded metal portions 1 having unexpanded ends 2, 3, which are formed integrally with the expanded portions and which also serve for interconnection of the elements— in fact the four element structure is entirely jointless, and is made from one sheet of metal in the following manner:—First a sheet of metal is expanded into a sheet having unexpanded edges as shown in Figure 14. This sheet is then cut transversely along the lines X of Figure 14 (which lines, it will be noted, do not extend right across the sheet) and small pieces are cut out at TP and TP'. The strips of material on either side of these transverse cuts are now bent to form split tubular members, alternate tubular members being formed by bending upwards with respect to the original general plane of the sheet, and the remaining alternate members being formed by bending downwards with respect thereto. The sheet is now bent about the lines Y so that the split tubular members, which have their split faces alternately above and below the original general plane of the sheet and parallel thereto now have their split faces all facing in the same direction, and parallel to one another, and at right angles to the said original general plane of the sheet. The unexpanded portions now lying between the elements are bent about the lines Z so as to bring the elements nearer to one another and form upstanding tags as shown in Figures 12 and 13. These tags may be drilled to receive external connections and provide a ready means for "tapping" the whole resistance at intermediate points. The four element structure is carried by bolts, insulated and passing through spacers after the general manner of the construction shown in Figures 9 to 11 and the holes to receive the bolts may be formed in the unexpanded edgings at any convenient stage in the process of manufacture— e. g. they may be stamped in the flat sheet shown in Figure 14 as also may any holes required to be present through the upstanding tags of Figures 12 and 13. It will be noted, however, that the spacers in the construction of Figures 12 and 13 do not have to carry the series current between elements since the said elements are integral with one another.

The construction of Figures 12 and 13 is very compact and efficient and is entirely jointless. Furthermore the wastage of metal in manufacture is so small as to be negligible and is practically confined to the material lost in forming the various holes (for the bolts and through the tags) and the material lost in cutting out the small portions at TP and TP' for it will be seen that the sum total of the developed widths of the elements is substantially equal to the full width W of the sheet shown in Figure 14.

The type of construction described with reference to Figures 12 to 14 is of course not confined to the particular number (four) of elements illustrated.

Figures 15 and 16 show in two views only a modification of the elements shown in Figures 1 to 3, the modification consisting merely in tapering the split tubular girder from end to end.

It will be appreciated that, regarded in a broad aspect, the invention provides a resistance element which derives a large part of its mechanical strength and stiffness by reason of its shape, and resistances in accordance with this invention are, in effect, tubular girders. It is from this fact that one of the principal advantages of the invention, namely, great lightness of weight combined with mechanical strength, arises. The advantage of lightness is obtained not only in the elements themselves, but also in the necessary housings and mountings therefor, for the elements will not, in an ordinary case, require other than end supports i. e. there will ordinarily be no intermediate supports necessary. This in turn simplifies, cheapens and lightens the housing, simplifies insulation and mounting, and results in improved cooling, since the obstruction to air flow in and about the elements will be small. Furthermore, owing to the light elastic and springy, yet strong nature of resistance elements in accordance with the invention, and their freedom from distortion even when raised to well above normal working temperatures, the carrier bars or the like from which the elements are carried can be made quite light since they do not have to withstand any substantial forces due to deformation.

The preferred forms of resistance are shown in the drawings, are cheap and easy to manufacture, relatively small in size, very strong and remarkably free from any serious distortion due to temperature rise, the principal effect of temperature rise being slightly to open or close the "splits" or spaces in the sections. Furthermore the resistance elements themselves (i. e. the expanded portions) are integral with the connecting portions (i. e. the unexpanded portions) which being themselves bent round into part tubular form, add materially to the strength and durability of the structure as a whole. Moreover owing to the very high ratio of superficial area to weight of metal, these expanded tubular resistances cool off very rapidly and can therefore be "rated high" for intermittent duty.

The materials employed in carrying out the invention will depend upon the duty and resistance required, e. g. stainless steel, ordinary iron, high resistance material or "Stalloy" iron, may be employed. "Stalloy" is a material used largely for transformer cores and having high specific resistance and therefore low hysteresis loss and low eddy current loss. It contains about 2.75% silicon and also small quantities of manganese sulphur and phosphorus.

What I claim is:—

1. An electrical resistance element constituted by expanded metal characterized in that the metal is bent into the form of a split tubular girder having a section which is not completely closed.

2. An electrical resistance element constituted by expanded metal characterized in that the metal is bent into the form of a split tubular girder having a rectangular section which is not completely closed.

3. An element as claimed in claim 1 and wherein the expanded metal is left with unexpanded edges at the ends of said split tubular girder which edges are integral with and form connections to the expanded portion, the split in said split tubular girder extending through both said unexpanded edges as well as through the expanded metal.

4. An element as set forth in claim 1 and wherein the split tubular girder is arched.

5. In combination, a plurality of elements as set forth in claim 1 and wherein the elements are left with unexpanded edges at the ends of the split tubular girders characterized in that adjacent elements are connected in series by means of portions of the unexpanded edges which are integral with the material of said elements, the split in each split tubular element extending through both unexpanded edges of said element as well as through the expanded metal.

6. An element as set forth in claim 1 and wherein the split tubular girder is tapered.

SYDNEY WILLIAM MELSOM.